United States Patent

Miyano

[11] Patent Number: 5,331,465
[45] Date of Patent: Jul. 19, 1994

[54] MACRO LENS

[75] Inventor: Hitoshi Miyano, Saitame, Japan

[73] Assignee: Fuji Photo Optical Co., Ltd., Saitame, Japan

[21] Appl. No.: 982,658

[22] Filed: Nov. 27, 1992

[30] Foreign Application Priority Data

Nov. 26, 1991 [JP] Japan .................................. 3-310588

[51] Int. Cl.$^5$ ............................................. G02B 15/22
[52] U.S. Cl. ..................................... 359/693; 359/740; 359/792
[58] Field of Search ............... 359/691, 693, 705, 792, 359/794, 740

[56] References Cited

U.S. PATENT DOCUMENTS 5,007,720  4/1991  Hamanishi .......................... 359/693

Primary Examiner—Scott J. Sugarman
Assistant Examiner—James Phan
Attorney, Agent, or Firm—Keck, Mahin & Cate

[57] ABSTRACT

A macro lens comprises first to third lens groups having positive powers and an aperture stop disposed the first and second lens groups. The first lens group, aperture stop and second lens group remain fixed with respect to one another and movable as one unit relative to the third lens group for focusing. The third lens group is stationary with respect to an image plane of the macro lens.

6 Claims, 13 Drawing Sheets

MACRO LENS

BACKGROUND OF THE INVENTION

1. Field of the Invention

The present invention relates to a macro lens having an exit pupil at a long distance for use with TV cameras with a color separation optical system, and, more particularly, to a macro lens which can form a sharp image of a subject located in a subject distance range from an infinite distance to the closest distance at which an image magnification is of approximately ⅓.

2. Description of Related Art

In order to produce fine quality close-up pictures, macro lenses typically have at least two groups of lens elements and are designed to move both the lens groups along the optical axis, changing an axial air spacing distance between the two lens groups. Such a macro lens is known from, for instance, Japanese Unexamined patent Publication No. 48-38,138.

In an attempt to decrease thrust movement of lenses or lens groups at very close focusing distances, some macro lenses of this kind are designed to cause a complicated relative movement of these lens groups along the optical axis so as to change an axial air spacing between each adjoining lens groups. Such a macro lens is known from, for instance, Japanese Unexamined patent Publication No. 58-186,714.

Both the macro lenses described in the above publications are designed for use with picture cameras and nothing is considered concerning a location of an exit pupil of the macro lens. Accordingly, the macro lenses are unavailable to color TV cameras having color separation optical systems which require a lens with an exit pupil located far away from an image plane of the lens. That is, as is well known to those skilled in the art, such a color separation optical system has a dichroic prism applied with an interference layer for separating light according to wavelengths. Since a macro lens having an exit pupil located at a relatively short distance from an image plane causes a principal ray to enter into the interference layer of the dichroic prism at greatly different incident angles depending upon image heights, color separation takes place differently according to lateral distances of principal rays from the optical axis due to a difference in optical path of the interference layer. If a principal ray is in parallel with the optical axis, in other words, if an exit pupil is located at infinity, the principal ray enters into the interference layer at a same incident angle independently from lateral distances of a principal ray from the optical axis, and color separation occurs with same characteristics. Although the allowable range of incident angle is slightly different according to dichroic prisms used in TV camera optical systems, it can be generally said that an incident angle of a principal ray less than one (1) degree is allowable.

An incident angle Ad of a principal ray is generally defined for an image having a height h by the following equation:

$$Ad = \tan^{-1} h/f$$

where f is the focal length of a lens.

If a TV camera has a 2/3" image plane whose diagonal size is 11.0 mm. and whose aspect ratio is 3:4, a lateral height of an image is 3.30 mm. Accordingly, the focal length f is 189.0 mm. for an incident angle (Ad) of a principal ray of one (1) degree. Consequently, in order for a principal ray to enter the dichroic prism at an incident angle within one (1) degree, the focal length f must be longer than 189.0 mm. On the other hand, a thrust movement of lens X from an infinity focusing distance is defined for a magnification M by the following equation:

$$X = M \times f$$

Accordingly, if the magnification M is ⅓, the thrust movement of lens X is 63.0 mm., which makes the overall length of the lens large.

SUMMARY OF THE INVENTION

It is an object of the present invention to provide a macro lens which enables a principal ray incident onto an image plane to be at a small angle with respect to the optical axis of the lens system and allows the thrust movement of the lens system for focusing to be small.

It is another object of the present invention to provide a macro lens having an exit pupil at a long distance.

The foregoing objects of the present invention are achieved by providing a macro lens comprising, from the subject end to the image end, a first lens group having a positive power, an aperture stop, a second lens group having a positive power and a third lens group having a positive power. The first lens group, the aperture stop and the second lens group remain fixed with respect to one another and are movable as one unit relative to the third lens group, which is stationary with respect to an image plane of the macro lens, along the optical axis for focusing. The macro lens is formed so as to satisfy the following conditions:

$$F_{12} < 0.5 \, f/M \tag{1}$$

$$Ff_a < d < Ff_b < 0 \tag{2}$$

where f is an overall focal length of said macro lens, M is a magnification for the closest focusing distance, $f_{12}$ is a composed focal length of the first and second groups, $Ff_a$ is a composed focal length of the second and third groups for an infinite focusing distance, $Ff_b$ is a composed focal length of the second and third groups for the closest focusing distance, and d is a distance between the foremost lens element of the second group and the aperture stop.

The macro lens, satisfying the condition (1), which is rewritten as $M \cdot f_{12} < 0.5f$, allows the first and second lens groups to move axially as one unit less than half of the overall focal length f of the macro lens for an infinite focusing distance.

The condition (2) indicates that an aperture stop is located between a front composed focal point of the second and third lens groups at an infinite focusing distance and a front composed focal point of the second and third lens groups at the closest focusing distance. In other words, in order to locate an exit pupil at an infinite distance, the aperture stop must be located at a front composed focal point of the lens groups disposed on the image end with respect to the aperture stop. Since the first lens group, the second lens group and the aperture stop disposed between the first and second lens groups are moved axially all together as one unit, an axial air spacing between two lens groups behind the aperture stop, namely the second and third lens groups, varies, so as to change the front composed focal point of the second and third lens groups in position. In order for the macro lens thus constructed to decrease the angle of the principal ray incident onto the image plane with respect to the optical axis, the principal ray must move gradually away from the optical axis as it travels toward the image end during an infinite focusing, be parallel with the optical axis between an infinite focusing and the closest focusing, and move closer to the optical axis as it travels toward the image end during the closest focusing. These optical characteristics can be performed by the macro lens satisfying the condition (2).

BRIEF DESCRIPTION OF THE DRAWINGS

The above and other objects, and features and advantages of the present invention will be understood by those skilled in the art from the following detailed description of preferred embodiments when considered in conjunction with the appended drawings, in which.

DETAILED DESCRIPTION OF THE PREFERRED EMBODIMENTS

Figure 1:
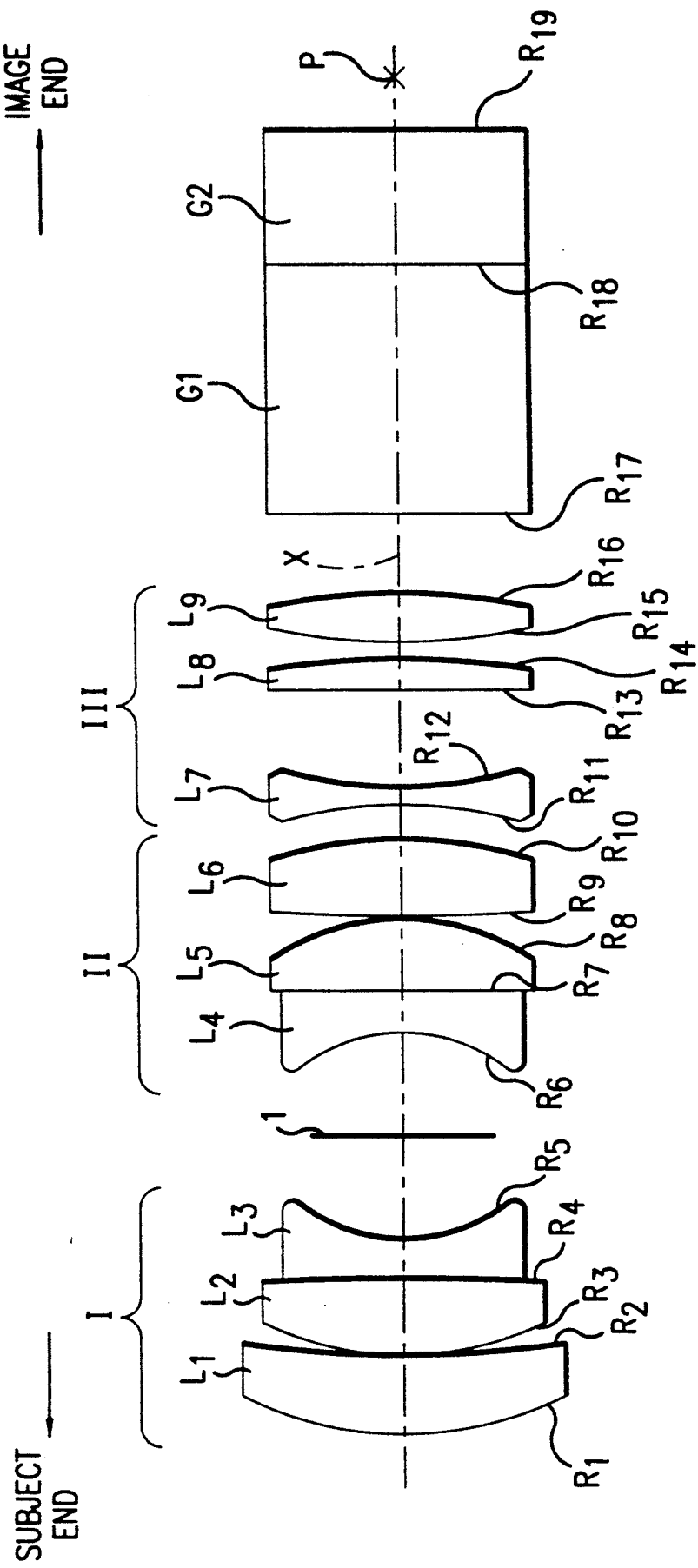
FIG. 1 is a diagrammatic side view of a macro lens in accordance with a preferred embodiment of the present invention.
Figure 2:
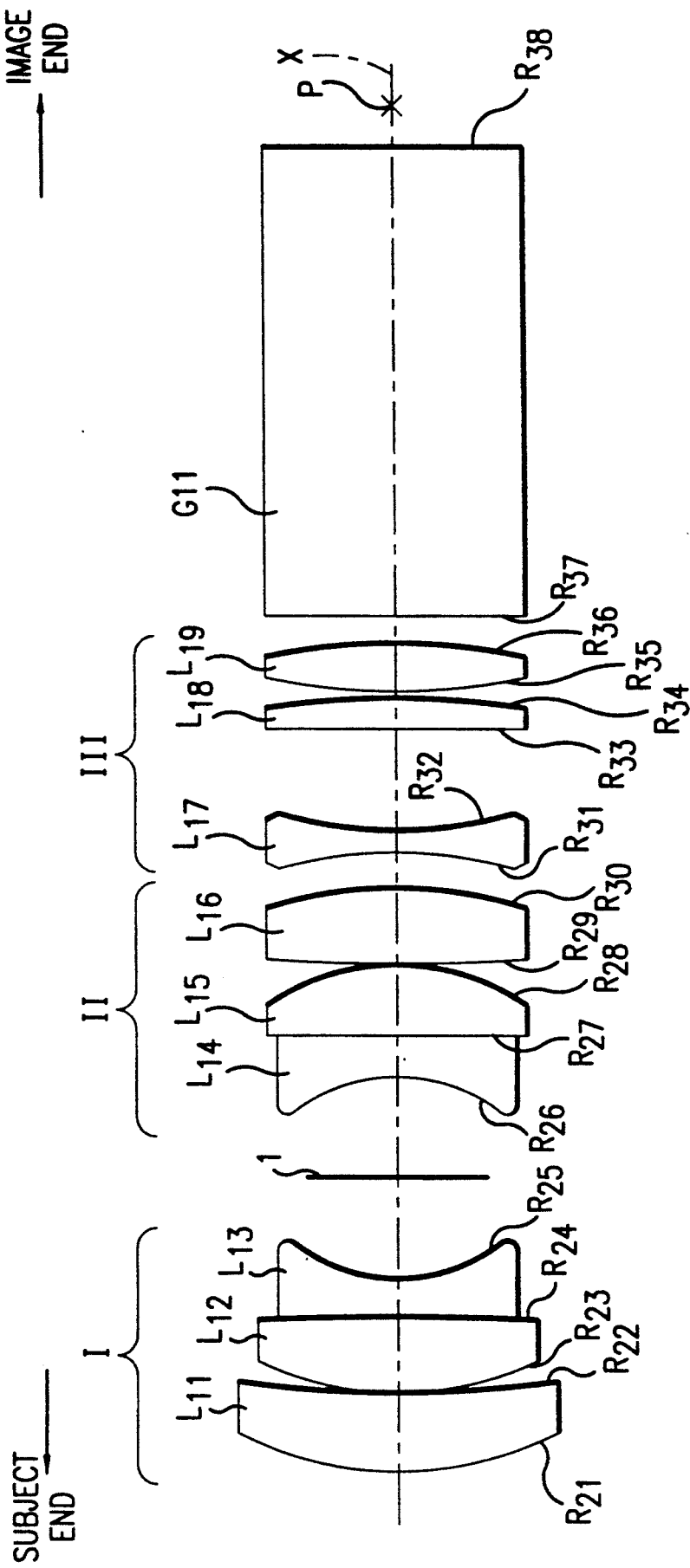
FIG. 2 is a diagrammatic side view of a macro lens in accordance with a preferred embodiment of the present invention.
Figure 3:
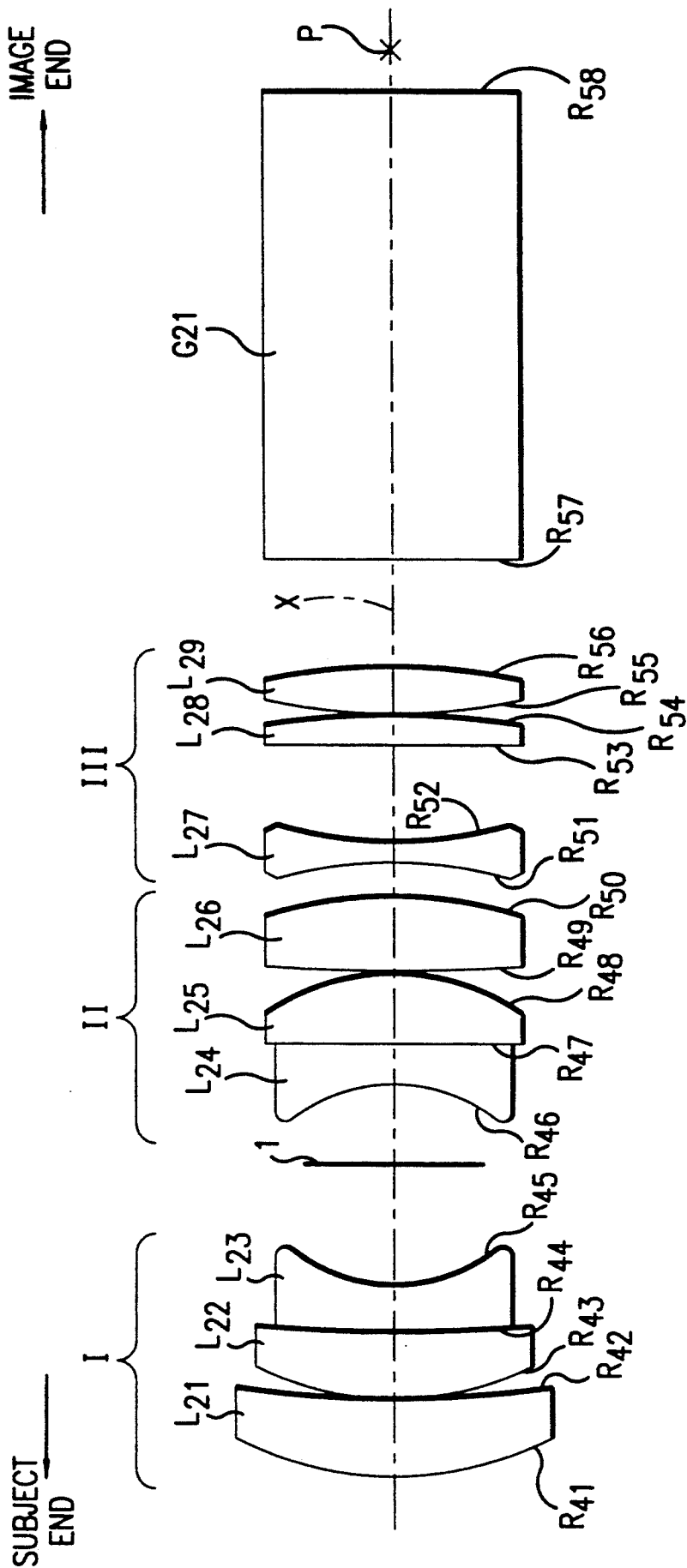
FIG. 3 is a diagrammatic side view of a macro lens in accordance with still another preferred embodiment of the present invention.
Figure 4A:
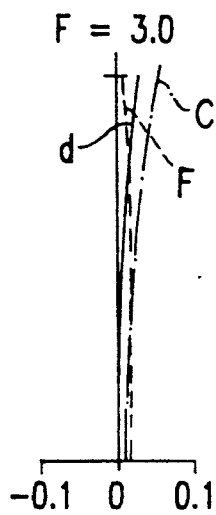
FIGS. 4A-4F and 5A-5F are graphs showing various aberrations of the macro lens shown in FIG. 1 for an infinite focusing distance and the closest focusing distance, respectively.
Figure 4B:
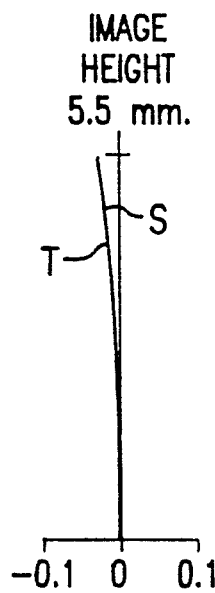
Figure 4C:
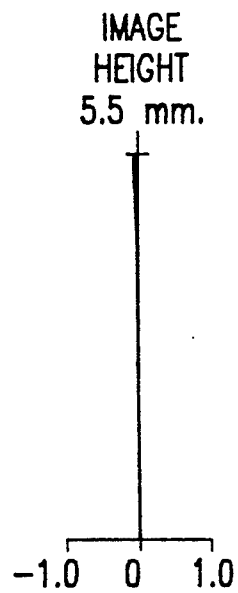
Figure 4D:
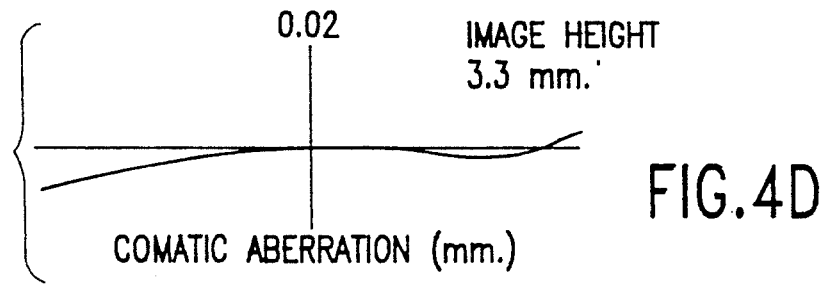
Figure 4E:
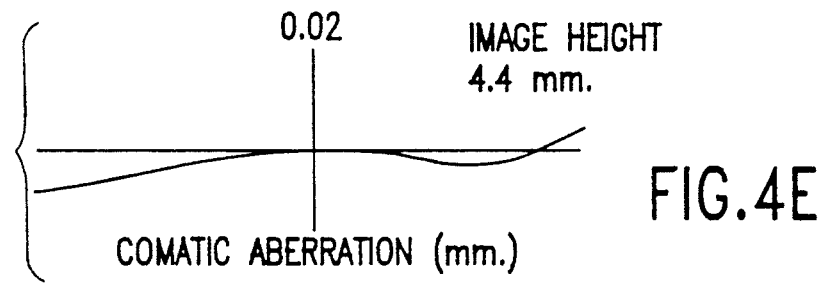
Figure 4F:
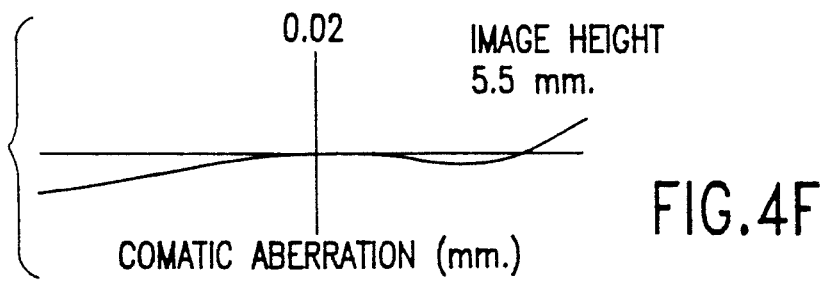
Figure 5A:
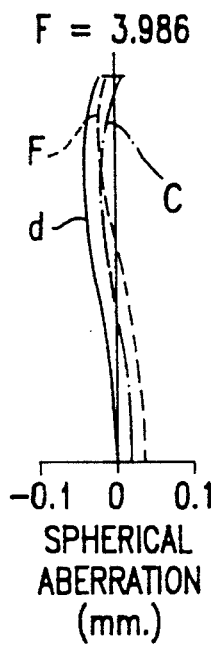
Figure 5B:
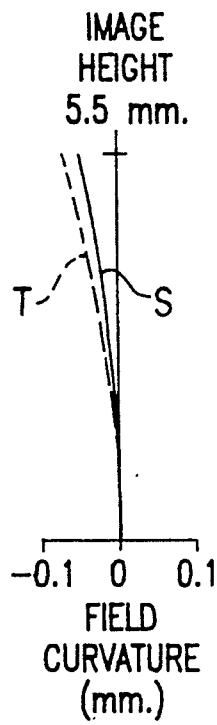
Figure 5C:
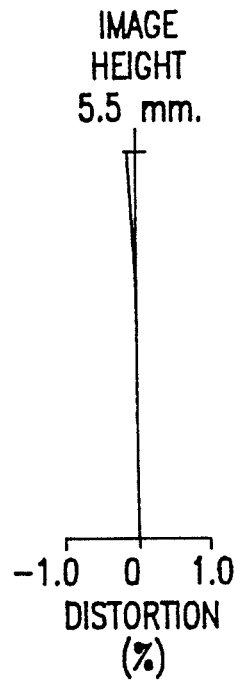
Figure 5D:
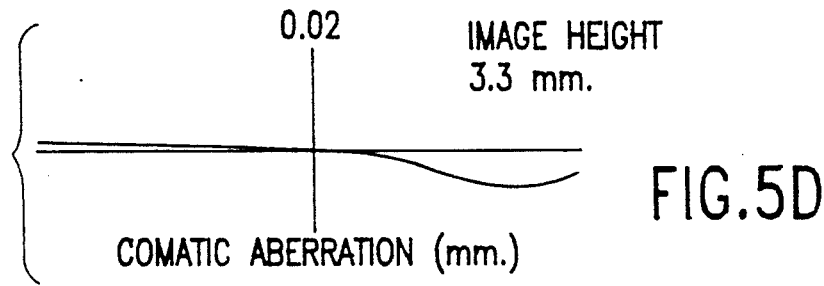
Figure 5E:
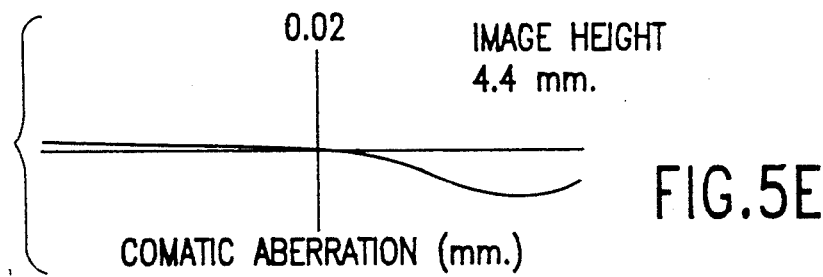
Figure 5F:
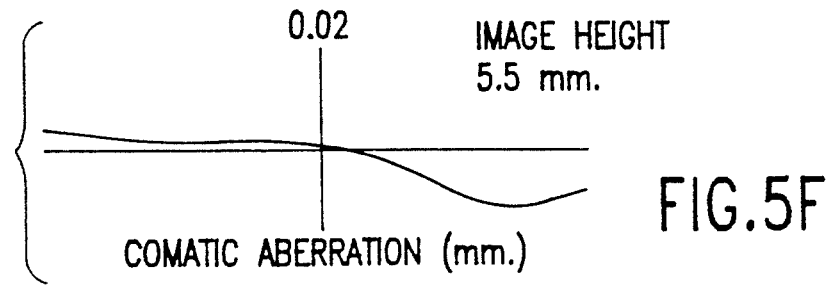
Figure 6A:
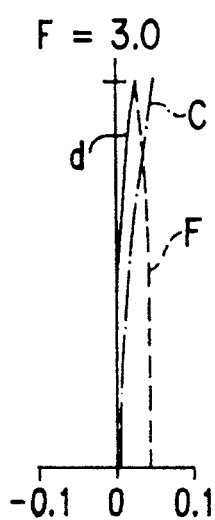
FIGS. 6A-6F and 7A-7F are graphs showing various aberrations of the macro lens shown in FIG. 2 for an infinite focusing distance and the closest focusing distance, respectively.
Figure 6B:
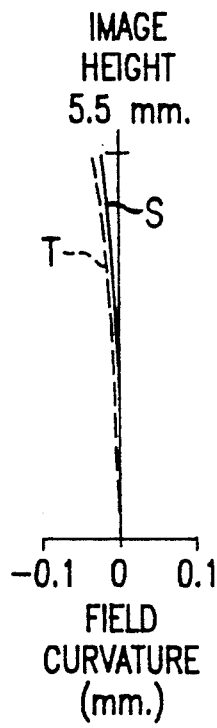
Figure 6C:
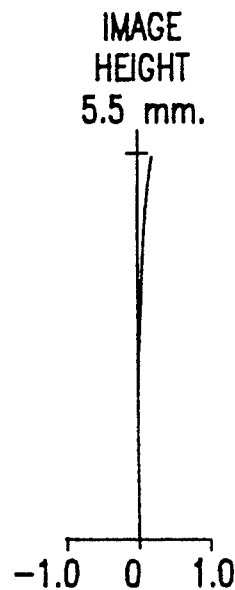
Figure 6D:
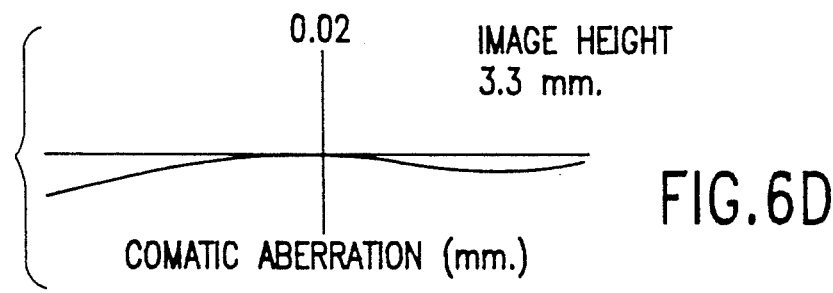
Figure 6E:
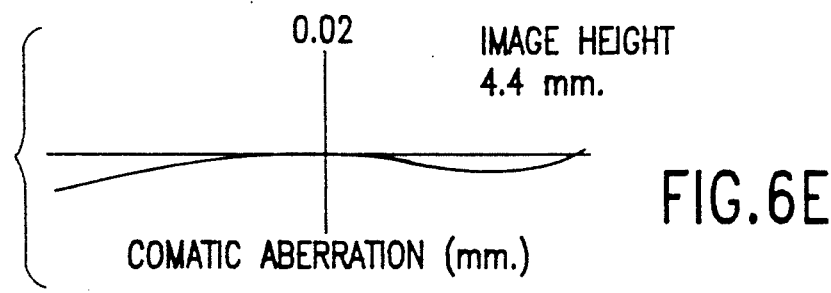
Figure 6F:
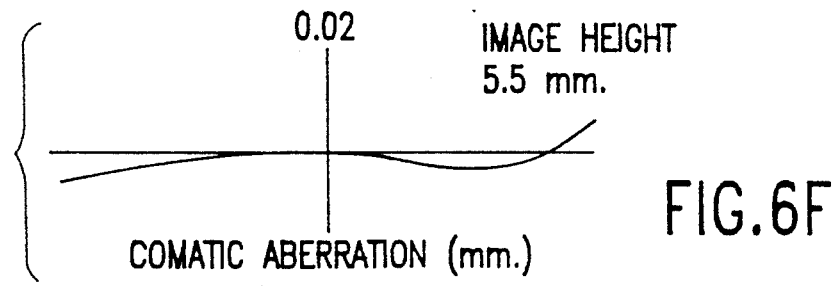
Figure 7A:
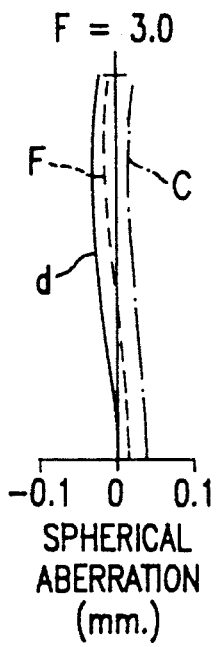
Figure 7B:
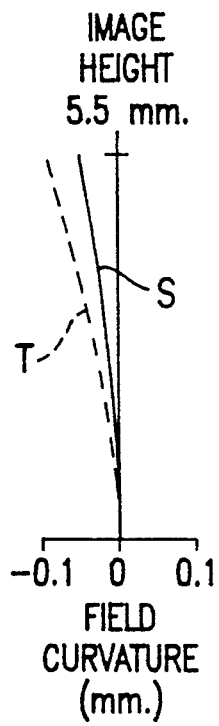
Figure 7C:
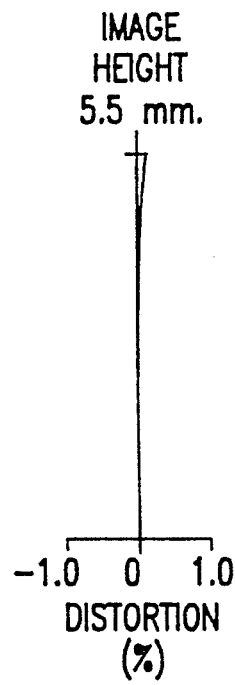
Figure 7D:
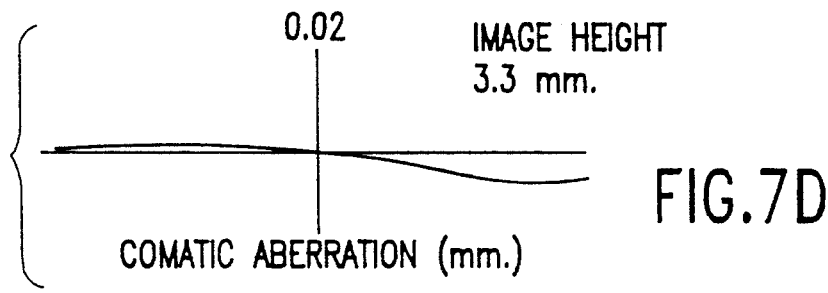
Figure 7E:
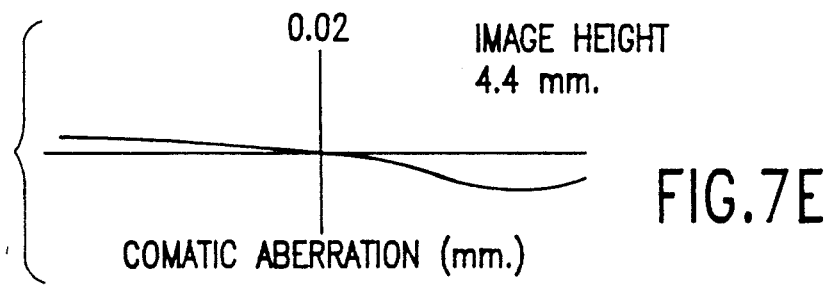
Figure 7F:
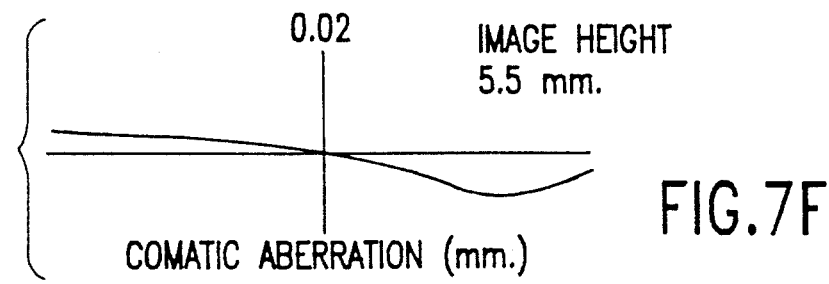
Figure 8A:
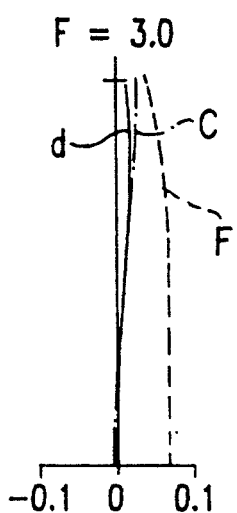
FIGS. 8A-8F and 9A-9F are graphs showing various aberrations of the macro lens shown in FIG. 3 for an infinite focusing distance and the closest focusing distance, respectively.
Figure 8B:
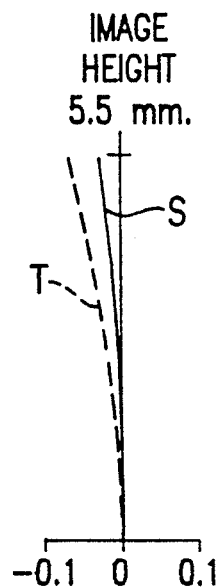
Figure 8C:
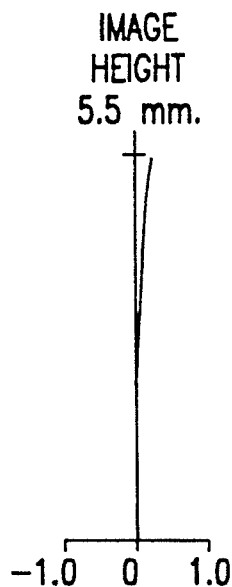
Figure 8D:
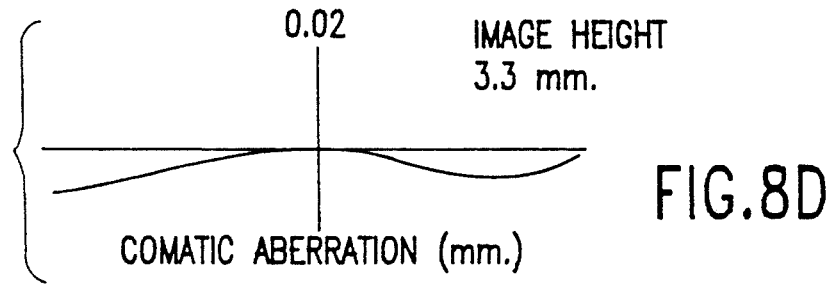
Figure 8E:
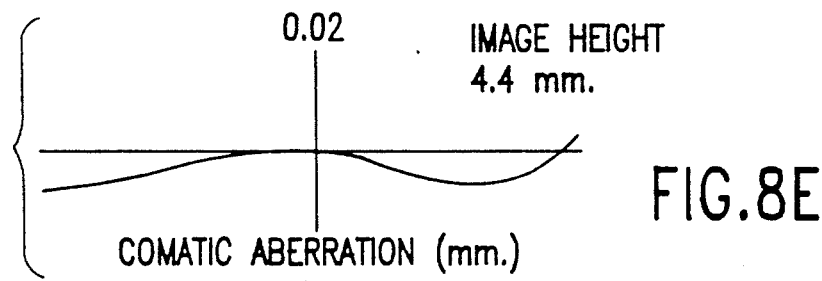
Figure 8F:
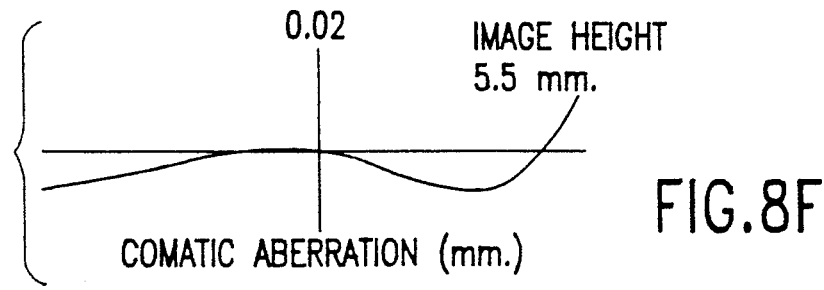
Figure 9A:
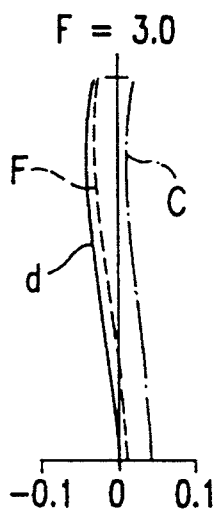
Figure 9B:
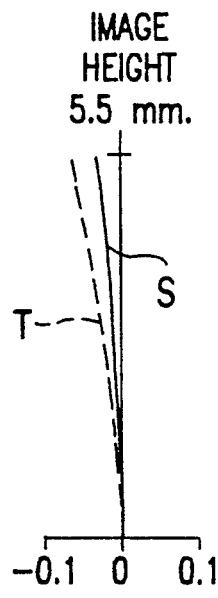
Figure 9C:
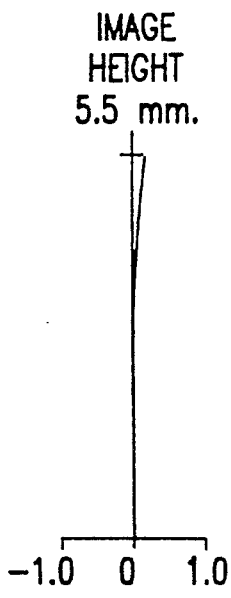
Figure 9D:
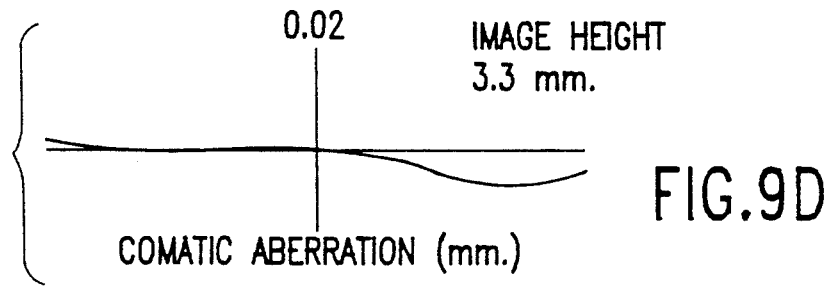
Figure 9E:
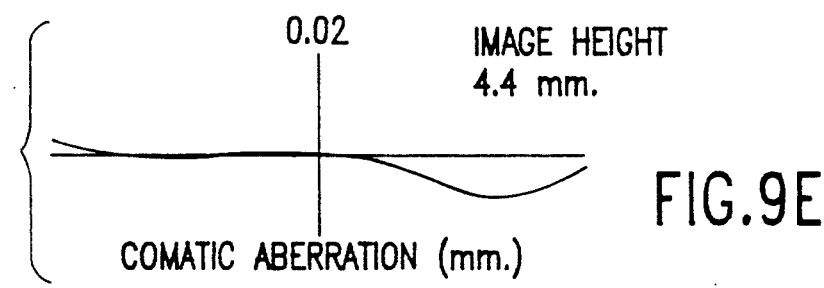
Figure 9F:
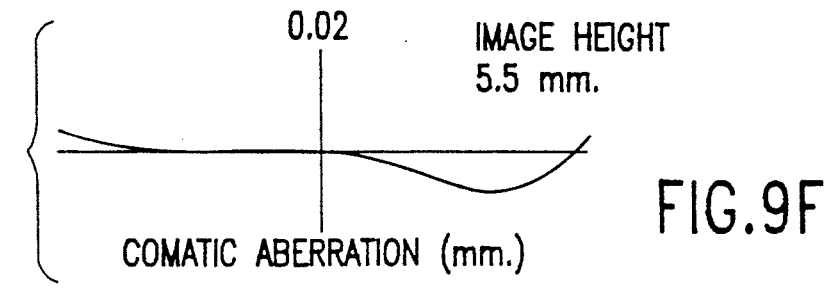

Briefly stated, macro lenses shown in FIGS. 1 to 3, embodying the present invention, includesthree groups of lens elements, namely a first group I, a second group II and a third group III arranged in order from the subject end. The first and second groups I and II are positionally fixed relative to each other and movable axially as one unit for focusing the optical system. The third group III remains fixed with respect to the image plane at all times. The macro lenses further include an aperture stop 1, such as a diaphragm, positioned between and remaining fixed with respect to the first and second groups I and II during focusing. For focusing the optical system on a subject at close distances, the first and second groups I and II are moved as one unit including the aperture stop 1 axially forward relative to the third group III. During such focusing, the optical system gradually increases an axial air spacing between the second and third groups II and III while keeping an axial air spacing between the first and second groups I and II unchanged. The macro lenses may preferably be defined as shown in the following table A:

TABLE A

|  | Embodiment I | Embodiment II | Embodiment III |
|---|---|---|---|
| f (mm.) | 75.01 | 75.00 | 75.00 |
| f No. | 3.0 | 3.0 | 3.0 |
| f12 (mm.) | 78.40 | 78.46 | 78.53 |
| f3 (mm.) | 99.08 | 96.99 | 101.67 |
| Ffa (mm.) | −13.908 | −13.305 | −13.475 |
| Ffb (mm.) | −4.729 | −4.069 | −4.317 |
| Bf3 (mm.) | 134.75 | 132.89 | 145.14 |
| d (mm.) | −10.80 | −11.50 | −8.20 |
| z (mm.) | −10.39 | −9.84 | −10.01 |
| d/z | 1.04 | 1.17 | 0.82 | where f is the overall focal length of the macro lens;

$f_{12}$ is the composed focal length of the first and second groups I and II;

$f_3$ is the focal length of the third group III;

$Ff_a$ is the composed focal length of the second and third groups II and III for an infinite focusing distance;

$Ff_b$ is the composed focal length of the second and third groups II and III for the closest focusing distance;

$Bf_3$ is the back focal length of the third group III;

d is the distance between the foremost lens element of the second group II and the aperture stop; and z is the value defined by the following equation:

$$z = -\sqrt{0.5[(Ff_a)^2 + (Ff_b)^2]}$$

In the following Tables I-III, the above embodiments I, II and III of the present invention are set forth for the closest focusing distances different from one another, with the parameters of the invention. In the following prescription tables, the reference L followed by an arabic numeral indicates the lens element progressively from the subject end to the image end of the lens. The reference radius numbers R are the progressive lens surface radii. Positive surface radii are struck from the right of the lens surface on the optical axis. Negative surface radii are struck from the left of the lens surface on the optical axis, Nd is index of refraction of the lens element for d spectrum, and Vd is the dispersion of the lens element for d spectrum as measured by the Abbe number.

Referring to FIG. 1, the macro lens includes first, second and third groups of lens elements I, II and III arranged in order from the subject end. The first lens groups I, having a positive overall power, is composed of three lens elements, namely first, second and third lens elements L1, L2 and L3 arranged in order from the subject end. The first lens element L1 is a positive meniscus lens convex to the subject end, the second lens element L2 is a biconvex lens with a convex surface having a smaller radius of curvature on the subject end, and the third lens element L3 is a biconcave lens with a concave surface having a smaller radius of curvature on the subject end. The second and third lens elements L2 and L3 are cemented together. The second lens groups II, having a positive overall power, is composed of three lens elements, namely fourth, fifth and sixth lens elements L4, L5 and L6 arranged in order from the subject end. The fourth lens element L4 is a negative meniscus lens convex to the image end, the fifth lens element L2 is a positive meniscus lens convex to the image end, and the sixth lens element L2 is a biconvex lens with a convex surface having a smaller radius of curvature on the image end. The fourth and fifth lens elements L4 and L5 are cemented together. The third lens group III, having a positive overall power, is composed of three lens elements, namely seventh, eighth and ninth lens elements L7, L8 and L9 arranged in order from the subject end. The seventh lens element L7 is a biconcave lens with a concave surface having a smaller radius of curvature on the image end, the eighth lens element L8 is a plano-convex lens convex to the image end, and the ninth lens element L9 is a biconvex lens with a convex surface having a smaller radius or curvature on the image end.

On the image end behind the optical system of the macro lens, there are two parallel glass blocks G1 and G2 functioning as an optical path adjusting means, which have different refraction indices and form part of a color separation optical system of a color TV camera. These optical glass blocks G1 and G2 are cemented together as one unit and located in the optical axis X before the back focal point P of the macro lens.

The macro lens shown in FIG. 1, which is scaled between the closest focusing distance of 229.12 mm. and infinity, is specifically described in the following Table I.

TABLE I

| Lens Component | Radius of Curvature (mm.) | Axial Distance Between Surfaces (mm.) | $N_d$ | $V_d$ |
| --- | --- | --- | --- | --- |
| L1 | R1 = 36.489 | 7.80 | 1.69200 | 50.6 |
|    | R2 = 125.980 | 0.20 | | |
| L2 | R3 = 31.708 | 7.80 | 1.62230 | 53.1 |
|    | R4 = −718.251 | | | |
| L3 | | 2.60 | 1.61340 | 43.8 |
|    | R5 = 17.887 | 22.80 | | |
| L4 | R6 = −17.887 | 2.60 | 1.60342 | 38.0 |
|    | R7 = −174.540 | | | |
| L5 | | 8.00 | 1.56907 | 71.3 |
|    | R8 = −22.556 | 0.20 | | |
| L6 | R9 = 118.921 | 8.00 | 1.56907 | 71.3 |
|    | R10 = −60.202 | Variable | | |
| L7 | R11 = −73.592 | 3.00 | 1.61340 | 43.8 |
|    | R12 = 34.094 | 9.75 | | |
| L8 | R13 = Infinity | 2.40 | 1.62280 | 56.9 |
|    | R14 = −133.779 | 1.41 | | |
| L9 | R15 = 55.049 | 5.22 | 1.62280 | 56.9 |
|    | R16 = −55.049 | 10.74 | | |
| G1 | R17 = Infinity | 33.00 | 1.60859 | 46.4 |
|    | R18 = Infinity | | | |
| G2 | | 13.20 | 1.51633 | 64.1 |
|    | R19 = Infinity | | | |

| Focusing distance | Variable Air Spacing (mm.) |
| --- | --- |
| Infinity | 3.302 |
| Closest (229.12 mm.) | 33.350 |
| (Magnification = 0.3667) | |

According to the above embodiment, the thrust movement of the lens is 30.048 mm., and the incident angle of the principal ray relative to the optical axis X at a lateral end in the image plane (at an image height of 3.30 mm.) is +0°19′ for an infinite subject and −0°15′ for the closest subject. The positive sign "+" indicates an angle of divergence with respect to the optical axis X at which light rays travel from the subject end toward the image end.

Referring to FIG. 2, the macro lens includes first, second and third groups of lens elements I, II and III arranged in order from the subject end. The first lens group I, having a positive overall power, is composed of three lens elements, namely first, second and third lens elements L11, L12 and L13 arranged in order from the subject end. Both the first lens element L11 and the second lens element L12 are positive meniscus lenses, each having a surface convex to the subject end, and the third lens element L13 is a negative meniscus lens with a convex surface on the subject end. The second and third lens elements L12 and L13 are cemented together. The second lens group II, having a positive overall power, is composed of three lens elements, namely fourth, fifth and sixth lens elements L14, L15 and L16 arranged in order from the subject end. The fourth lens element L14 is a biconcave lens with a concave surface having a smaller radius of curvature on the subject end. Both the fifth lens element L15 and the sixth lens element L16 are biconvex lenses, each having a convex surface having a smaller radius of curvature on the image end. The fourth and fifth lens elements L14 and L15 are cemented together. The third lens group III, having a positive overall power, is composed of three lens elements, namely seventh, eighth and ninth lens elements L17, L18 and L19 arranged in order from the subject end. The seventh lens element L17 is a biconcave lens with a concave surface having a smaller radius of curvature on the image end, the eighth lens element L18 is a biconvex lens with a convex surface having a smaller radius of curvature on the image end, and the ninth lens element L19 is a biconvex lens with a convex surface having a smaller radius of curvature on the image end.

On the image end behind the optical system of the macro lens, there is a parallel glass block G11 functioning as an optical path adjusting means, which forms part of a color separation optical system of a color TV camera. The optical glass block G11 is located in the optical axis X before the back focal point P of the macro lens.

The macro lens shown in FIG. 2, which is scaled between the closest focusing distance of 228.53 mm. and infinity, is specifically described in the following Table II.

TABLE II

| Lens Component | Radius of Curvature (mm.) | Axial Distance Between Surfaces (mm.) | $N_d$ | $V_d$ |
| --- | --- | --- | --- | --- |
| L11 | R21 = 35.371 | 7.80 | 1.69200 | 50.6 |
|     | R22 = 130.006 | 0.20 | | |
| L12 | R23 = 32.884 | 7.80 | 1.62041 | 60.3 |
|     | R24 = 155.189 | | | |
| L13 | | 2.60 | 1.61340 | 43.8 |
|     | R25 = 17.470 | 22.80 | | |
| L14 | R26 = −16.545 | 2.60 | 1.60342 | 38.0 |
|     | R27 = 3248.230 | | | |
| L15 | | 8.00 | 1.56907 | 71.3 |
|     | R28 = −21.273 | 0.20 | | |
|     | R29 = 157.512 | | | |

TABLE II-continued

| | | | | |
|---|---|---|---|---|
| L16 | | 8.00 | 1.69350 | 53.4 |
| | R30 = −69.888 | | | |
| | | Variable | | |
| | R31 = −50.838 | | | |
| L17 | | 3.00 | 1.61340 | 43.8 |
| | R32 = 37.091 | | | |
| | | 9.12 | | |
| | R33 = 467.288 | | | |
| L18 | | 2.29 | 1.64000 | 60.1 |
| | R34 = −103.520 | | | |
| | | 0.65 | | |
| | R35 = 85.556 | | | |
| L19 | | 5.98 | 1.64000 | 60.1 |
| | R36 = −45.369 | | | |
| | | 3.57 | | |
| | R37 = Infinity | | | |
| G11 | | 55.50 | 1.51633 | 64.1 |
| | R38 = Infinity | | | |

| Focusing Distance | Variable Air Spacing |
|---|---|
| Infinity | 3.749 |
| Closest (228.53 mm.) | 33.843 |
| (Magnification = 0.3667) | |

In the above embodiment, the thrust movement of the lens is 30.094 mm., and the incident angle of the principal ray relative to the optical axis X at a lateral end in the image plane (at an image height of 3.30 mm.) is +0°23' for an infinite subject and −0°09' for the closest subject.

Referring to FIG. 3, the macro lens includes first, second and third groups of lens elements I, II and III arranged in order from the subject end. The first lens group I, having a positive overall power, is composed of three lens elements, namely first, second and third lens elements L21, L22 and L23 arranged in order from the subject end. Both the first lens element L21 and the second lens element L22 are positive meniscus lenses, each having a surface convex to the subject end, and the third lens element L23 is a negative meniscus lens with a convex surface on the subject end. The second and third lens elements L22 and L23 are cemented together. The second lens group II, having a positive overall power, is composed of three lens elements, namely fourth, fifth and sixth lens elements L24, L25 and L26 arranged in order from the subject end. The fourth lens element L24 is a negative meniscus lens convex to image end. The fifth lens element L25 is a positive meniscus lens convex to image end. The sixth lens element L26 is a biconvex lens with a convex surface having a smaller radius of curvature on the image end. The fourth and fifth lens elements L24 and L25 are cemented together. The third lens group III, having a positive overall power, is composed of three lens elements, namely seventh, eighth and ninth lens elements L27, L28 and L29 arranged in order from the subject end. The seventh lens element L27 is a biconcave lens with a concave surface having a smaller radius of curvature on the image end. Both the eighth lens element L28 and the ninth lens element L29 are biconvex lenses, each having a convex surface having a smaller radius of curvature on the image end.

On the image end behind the optical system of the macro lens, there is disposed a parallel glass block G21 functioning as an optical path adjusting means, which forms part of a color separation optical system of a color TV camera. The optical glass block G21 is located in the optical axis X before the back focal point P of the macro lens.

The macro lens shown in FIG. 3, which is scaled between the closest focusing distance of 227.77 mm. and infinity, is specifically described in the following Table III:

TABLE III

| Lens Component | Radius of Curvature (mm.) | Axial Distance Between Surfaces (mm.) | $N_d$ | $V_d$ |
|---|---|---|---|---|
| L21 | R41 = 38.935 | 7.80 | 1.69200 | 50.6 |
| | R42 = 187.031 | 0.20 | | |
| L22 | R43 = 32.320 | 7.80 | 1.62280 | 56.9 |
| | R44 = 100.001 | | | |
| L23 | | 2.60 | 1.61340 | 43.8 |
| | R45 = 17.641 | 22.80 | | |
| L24 | R46 = −17.775 | 2.60 | 1.60342 | 38.0 |
| | R47 = −620.324 | | | |
| L25 | | 8.00 | 1.56907 | 71.3 |
| | R48 = −22.042 | 0.20 | | |
| | R49 = 268.749 | | | |
| L26 | | 8.00 | 1.69680 | 56.5 |
| | R50 = −61.535 | Variable | | |
| | R51 = −42.820 | | | |
| L27 | | 3.00 | 1.61340 | 43.8 |
| | R52 = 36.328 | 9.78 | | |
| | R53 = 450.496 | | | |
| L28 | | 2.29 | 1.61700 | 62.8 |
| | R54 = −89.385 | 0.0 | | |
| | R55 = 104.389 | | | |
| L29 | | 5.98 | 1.61700 | 62.8 |
| | R56 = −40.049 | 11.42 | | |
| | R57 = Infinity | | | |
| G21 | | 55.50 | 1.51633 | 64.1 |
| | R58 = Infinity | | | |

| Focusing Distance | Variable Air Spacing |
|---|---|
| Infinity | 3.749 |
| Closest (227.77 mm.) | 33.898 |
| (Magnification = 0.3667) | |

According to the above embodiment, the thrust movement of the lens is 30.149 mm., and the incident angle of the principal ray relative to the optical axis X at a lateral end in the image plane (at an image height of 3.30 mm.) is +0°11" for an infinite subject and −0°25' for the closest subject.

All the macro lenses described above satisfy the following conditions:

$$f_{12} < 0.5 f/M$$

$$Ff_a < d < Ff_b < 0$$

where f is the overall focal length of the macro lens, $f_{12}$ is the composed focal length of the first and second groups I and II, $Ff_a$ is the composed focal length of the second and third groups II and III for an infinite focusing distance, $Ff_b$ is the composed focal length of the second and third groups II and III for the closest focusing distance, d is the distance between the foremost lens element of the second group II and the aperture stop 1, and M is the magnification for the closest focusing distance.

Each the macro lens further satisfies the following condition:

$$0.8 < d/-\sqrt{0.5[(Ff_a)^2 + (Ff_b)^2]} < 1.2$$

This condition indicates that the distance d between the foremost lens element of the second group II and the aperture stop i is almost equal to, and more specifically, larger than 80%, but smaller than 120%, of the square root of the geometric mean of the square of the composed focal length of the second and third groups II and III for infinite and the closest focusing distances $Ff_a$ and $Ff_b$. The macro lens satisfying this condition maintains an incident angle of a principal ray small.

In the macro lens of each above-described embodiment, the third lens group III is composed of the negative power lens element L7, L17 or L27, the positive power lens element L8, L18 or L28 and the positive power lens element L9, L19 or L29 arranged in order from the subject end to the image end. In the lens arrangement of the third lens group III, the negative power lens element L7, L17 or L27 arranged in the foremost position of the third lens group III functions to elevate a principal ray incident onto the adjacent positive power lens element L8, L18 or L28, respectively, approximately to an image height, so as to place an exit pupil far away from the color separation optical system.

Letting $f_3$ and $Bf_3$ be the composed focal length of the third lens group III and the back focal length of the third lens group III, respectively, the macro lens of each above-described embodiment further satisfies the following condition:

$$Bf_3 > f_3$$

The third lens group III satisfying this condition provides the macro lens with a back focal length as sufficiently long as required for TV cameras with a color separation optical system.

The third lens group III of the macro lens of each above-described embodiment is composed of the biconcave lens element L7, L17 or L27, the positive power lens element L8, L18 or L28 with a convex surface having a smaller radius of curvature on the image end, and the biconvex lens L9, L19 or L29 arranged in order from the subject end to the image end. Although the third lens group III is composed of a small number of lens elements, the lens arrangement of the third lens group III enables the optical system to elevate a principal ray approximately to an image height so as to place an exit pupil far away and provide a sufficiently long back focal length. Furthermore, in order to prevent light rays diverged by the biconcave lens L7, L17 or L27 from being steeply converged, one of the two positive lens elements (L8, L18 or L28), which is disposed on the subject end, is formed to have a subject end surface having a large radius of curvature, so as to prevent an enhancement of comatic aberration.

FIGS. 4A-4F, 6A-6F and 8A-8F graphically show various aberrations of the macro lenses of the above embodiments I, II and III, respectively, for an infinite subject distance. FIGS. 5A-5F, 7A-7F and 9A-9F, graphically show various aberrations of the macro lenses of the above embodiments I, II and III, respectively, for the closest subject distance.

Better performance provided by the macro lens of the present invention will be understood by comparing it with a prior art macro lens.

Figure 10:
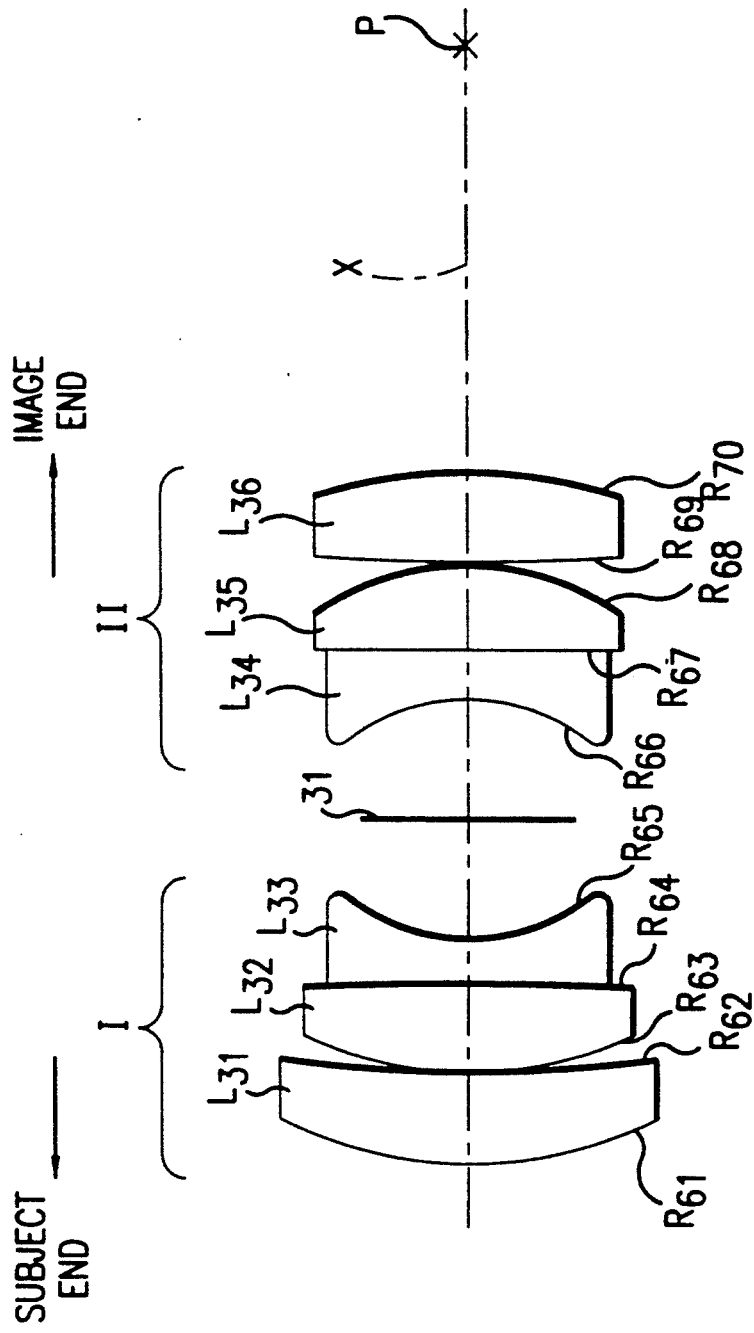
FIG. 10 is a diagrammatic side view of a prior art macro lens.
Figure 11A:
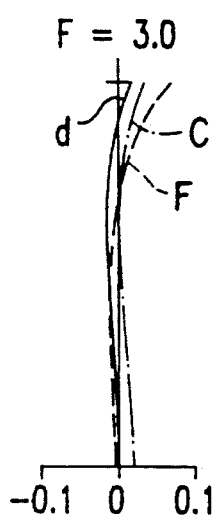
FIGS. 11A-11F and 12A-12F are graphs showing various aberrations of the macro lens shown in FIG. 10 for an infinite focusing distance and the closest focusing distance, respectively.
Figure 11B:
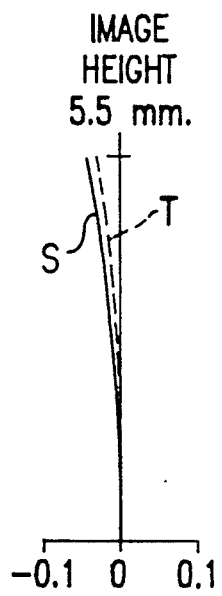
Figure 11C:
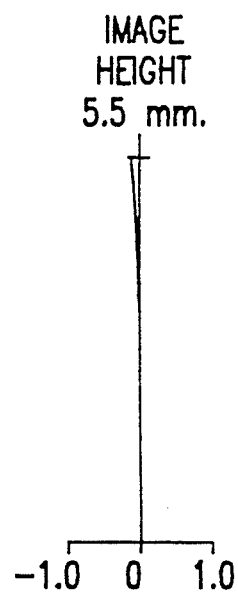
Figure 11D:
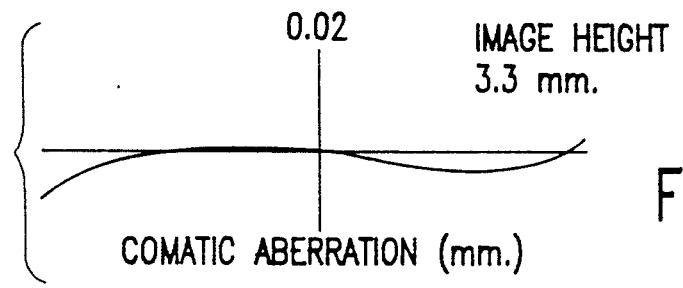
Figure 11E:
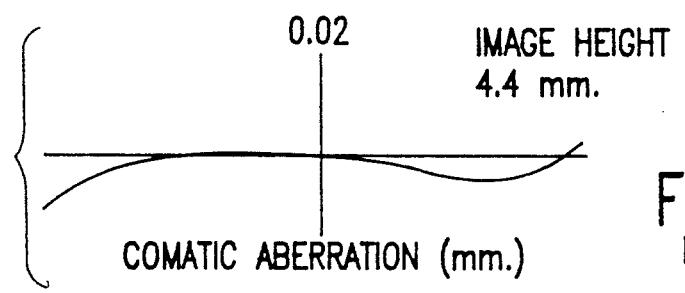
Figure 11F:
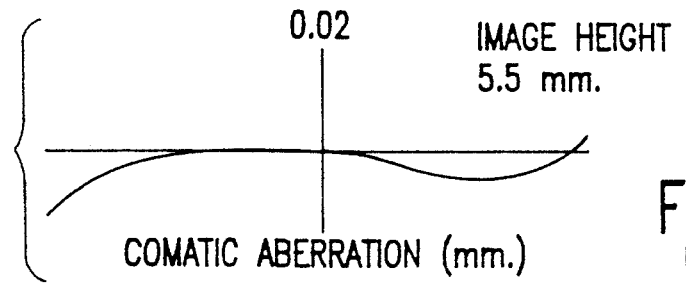
Figure 12A:
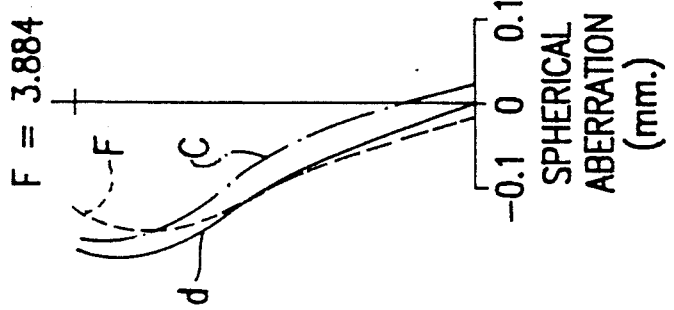
Figure 12B:
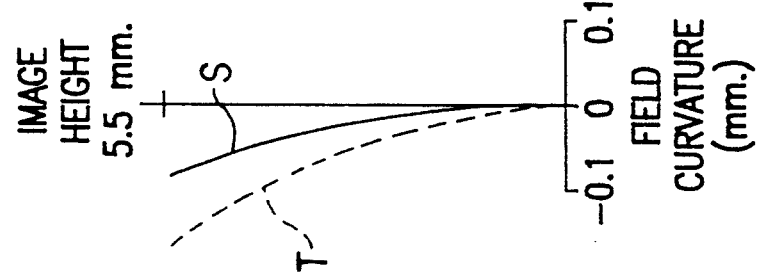
Figure 12C:
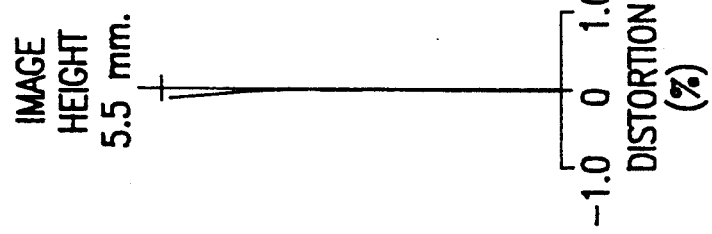
Figure 12D:
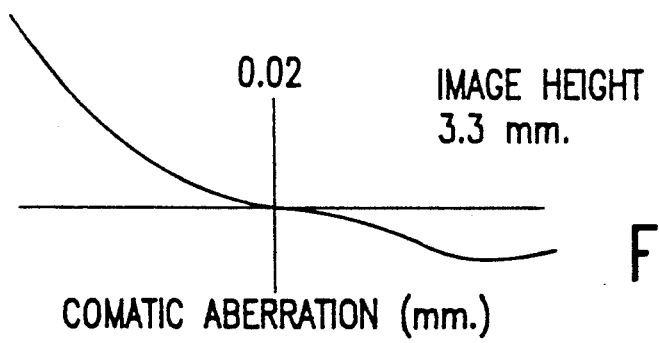
Figure 12E:
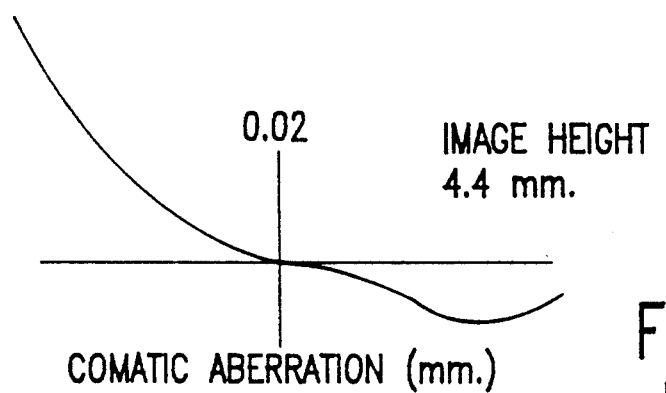
Figure 12F:
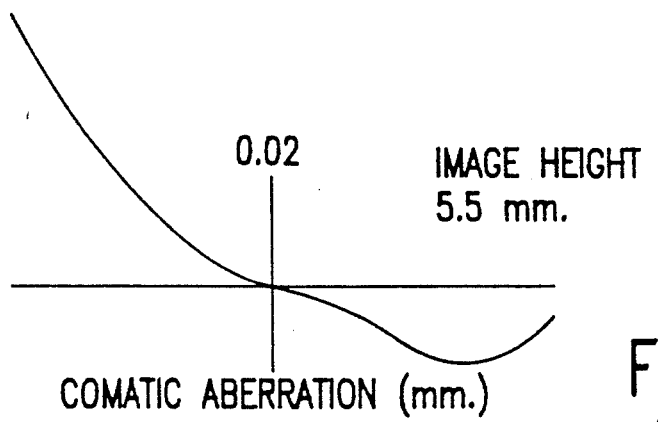

Referring to FIG. 10, a prior art macro lens, which is a Gauss type lens and designed so as to be used with a TV camera, includes first and second groups of lens elements I and II arranged in order from the subject end. The first lens group I is composed of three lens elements, namely first, second and third lens elements L31, L32 and L33 arranged in order from the subject end. The first lens element L31 is a positive meniscus lens having a convex surface on the subject end, the second lens element L32 is a biconvex lens with a convex surface having a smaller radius of curvature on the subject end, and the third lens element L33 is a biconcave lens with a surface having a smaller radius of curvature on the image end. The second and third lens elements L32 and L33 are cemented together. The second lens group II is composed of three lens elements, namely fourth, fifth and sixth lens elements L34, L35 and L36 arranged in order from the subject end. The fourth lens element L34 is a biconcave lens with a surface having a smaller radius of curvature on the image end. Both the fifth lens element L35 and the sixth lens element L36 are biconvex lenses, each having a surface having a smaller radius of curvature on the image end. The fourth and fifth lens elements L34 and L35 are cemented together. The macro lens has an aperture stop 31 between the first and second groups I and II.

The prior art macro lens shown in FIG. 10 is specifically described in the following Table IV:

TABLE IV

| Lens Component | Radius of Curvature (mm.) | Axial Distance Between Surfaces (mm.) | $N_d$ | $V_d$ |
| --- | --- | --- | --- | --- |
| L31 | R61 = 38.155 | 8.00 | 1.69200 | 50.6 |
|  | R62 = 103.110 | 0.20 |  |  |
| L32 | R63 = 28.175 | 8.00 | 1.56907 | 71.3 |
|  | R64 = −300.400 |  |  |  |
| L33 | R65 = 17.484 | 2.60 | 1.61340 | 43.8 |
|  | R66 = −20.457 | 23.40 |  |  |
| L34 | R67 = 256.390 | 2.60 | 1.60342 | 38.0 |
| L35 | R68 = −22.042 | 8.00 | 1.56907 | 71.3 |
|  | R69 = 97.110 | 0.20 |  |  |
| L36 | R70 = −91.476 | 8.00 | 1.69200 | 50.6 |

In the prior art macro lens, which has the overall focal length of 75.0 mm. and the F No. for a full opened aperture stop of 3.0, the incident angle of the principal ray relative to the optical axis X at a lateral end in the image plane (at an image height of 3.30 mm.) is +2°03' for an infinite subject and +1°35' for the closest subject. FIGS. 11 and 12 show various aberrations of the prior art macro lenses for an infinite subject distance and the closest subject distance, respectively.

As apparent in comparing with the prior art macro lens, the macro lens of the present invention enables a principal ray incident at quite small angles.

It is to be understood that although the present invention has been described in detail with respect to preferred embodiments, various other embodiments and variants may occur to those skilled in the art by following the teachings herein. For example, not only the number of lens elements of each lens group but also the radius of curvature of a surface of each lens element can be changed with the same result as the above-described embodiments. Further, the macro lens may be used with image forming optical instruments as well as various color TV cameras having a color separation optical system. Such other embodiments and variants which fall within the scope and spirit of the invention are intended to be covered by the following claims.

What is claimed is:

1. A macro lens comprising, from a subject end to an image end, a first lens group having a positive power, an aperture stop, a second lens group having a positive power and a third lens group having a positive power, said first lens group, said aperture stop and said second lens group remaining fixed with respect to one another and movable as one unit relative to said third lens group, which is stationary with respect to an image plane of the macro lens, along an optical axis of said macro lens for focusing, said macro lens satisfying the following conditions:

$$F_{12} < 0.5 \times f/M$$

$$Ff_a < d < [fd_d]Ff_b < 0$$

where f is an overall focal length of said macro lens;
M is a magnification for a closest focusing distance;
$F_{12}$ is a composed focal length of said first and second lens groups;
$Ff_a$ is a composed focal length of said second and third lens groups for an infinite focusing distance;
$Ff_b$ is a composed focal length of said second and third lens groups for the closest focusing distance; and
d is the distance between a foremost lens element of the second lens group and the aperture stop.

2. A macro lens as defined in claim 1, and further satisfying the following condition:

$$0.8 < d/-\sqrt{0.5[(Ffa)^2 + (Ffb)^2]} < 1.2.$$

3. A macro lens as defined in claim 2, and further satisfying the following condition:

$$Bf_3 > f_3$$

where $f_3$ is a composed focal length of said third lens group; and
$Bf_3$ is a back focal length of said third lens group.

4. A macro lens as defined in claim 1, further including two parallel glass blocks G1 and G2 as optical path adjusting means for adjusting an optical path length, said macro lens being scaled between a closest focusing distance of 229.12 mm. and infinity with the first lens group including lens elements L1–L3, the second lens group including elements L4–L6 and the third lens groups including lens elements L7–L9 substantially as described:

| Lens Element | Radius of Curvature (mm.) | Axial Distance Between Surfaces (mm.) | $N_d$ | $V_d$ |
|---|---|---|---|---|
| L1 | R1 = 36.489 | 7.80 | 1.69200 | 50.6 |
|  | R2 = 125.980 | 0.20 |  |  |
| L2 | R3 = 31.708 | 7.80 | 1.62230 | 53.1 |
|  | R4 = −718.251 |  |  |  |
| L3 | R5 = 17.887 | 2.60 | 1.61340 | 43.8 |
|  | R6 = −17.887 | 22.80 |  |  |
| L4 | R7 = −174.540 | 2.60 | 1.60342 | 38.0 |
| L5 | R8 = −22.556 | 8.00 | 1.56907 | 71.3 |
|  | R9 = 118.921 | 0.20 |  |  |
| L6 | R10 = −60.202 | 8.00 | 1.56907 | 71.3 |
|  | R11 = −73.592 | Variable |  |  |
| L7 | R12 = 34.094 | 3.00 | 1.61340 | 43.8 |
|  | R13 = Infinity | 9.75 |  |  |
| L8 | R14 = −133.779 | 2.40 | 1.62280 | 56.9 |
|  | R15 = 55.049 | 1.41 |  |  |
| L9 | R16 = −55.049 | 5.22 | 1.62280 | 56.9 |
|  | R17 = Infinity | 10.74 |  |  |
| G1 | R18 = Infinity | 33.00 | 1.60859 | 46.4 |
| G2 | R19 = Infinity | 13.20 | 1.51633 | 64.1 | where the lens elements L1 to L9 and the glass blocks G1 and G2 have surfaces R1 to R19, the index of refraction is given by $N_d$, and the dispersion is measured by the Abbe No. as given by $V_d$.

5. A macro lens as defined in claim 1, further including a parallel glass block G11 as optical path adjusting means for adjusting an optical path length, said macro lens being scaled between a closest focusing distance of 228.53 mm. and infinity with the first lens group including lens elements L11–L13, the second lens group including elements L14–L16 and the third lens group including lens elements L17–L19 substantially as described:

| Lens Element | Radius of Curvature (mm.) | Axial Distance Between Surfaces (mm.) | $N_d$ | $V_d$ |
|---|---|---|---|---|
| L11 | R21 = 35.371 | 7.80 | 1.69200 | 50.6 |
|  | R22 = 130.006 | 0.20 |  |  |
| L12 | R23 = 32.884 | 7.80 | 1.62041 | 60.3 |
|  | R24 = 155.189 |  |  |  |
| L13 | R25 = 17.470 | 2.60 | 1.61340 | 43.8 |
|  | R26 = −16.545 | 22.80 |  |  |
| L14 | R27 = 3248.230 | 2.60 | 1.60342 | 38.0 |
| L15 | R28 = −21.273 | 8.00 | 1.56907 | 71.3 |
|  | R29 = 157.512 | 0.20 |  |  |
| L16 | R30 = −69.888 | 8.00 | 1.69350 | 53.4 |
|  |  | Variable |  |  |
| L17 | R31 = −50.838 | 3.00 | 1.61340 | 43.8 |
|  | R32 = 37.091 | 9.12 |  |  |
|  | R33 = 467.288 |  |  |  |

| Lens Element | Radius of Curvature (mm.) | Axial Distance Between Surfaces (mm.) | $N_d$ | $V_d$ |
|---|---|---|---|---|
| L18 |  | 2.29 | 1.64000 | 60.1 |
|  | R34 = −103.520 |  |  |  |
|  |  | 0.65 |  |  |
|  | R35 = 85.556 |  |  |  |
| L19 |  | 5.98 | 1.64000 | 60.1 |
|  | R36 = −45.369 |  |  |  |
|  |  | 3.57 |  |  |
|  | R37 = Infinity |  |  |  |
| G11 |  | 55.50 | 1.51633 | 64.1 |
|  | R38 = Infinity |  |  |  | where the lens elements L11 to L19 and the glass block G11 have surfaces R21 to R38, the index of refraction is given by $N_d$, and the dispersion is measured by the Abbe No. as given by $V_d$.

6. A macro lens as defined in claim 1, further including a parallel glass block G21 as optical path adjusting means for adjusting an optical path length, said macro lens being s scaled between a closest focusing distance of 227.77 mm. and infinity with the first lens group including lens elements L21–L23, the second lens group including elements L24–L26 and the third lens group including lens elements L27–L29 substantially as described:

| Lens Element | Radius of Curvature (mm.) | Axial Distance Between Surfaces (mm.) | $N_d$ | $V_d$ |
|---|---|---|---|---|
|  | R41 = 38.935 |  |  |  |
| L21 |  | 7.80 | 1.69200 | 50.6 |
|  | R42 = 187.031 |  |  |  |
|  |  | 0.20 |  |  |
|  | R43 = 32.320 |  |  |  |
| L22 |  | 7.80 | 1.62280 | 56.9 |
|  | R44 = 100.001 |  |  |  |
| L23 |  | 2.60 | 1.61340 | 43.8 |
|  | R45 = 17.641 |  |  |  |
|  |  | 22.80 |  |  |
|  | R46 = −17.775 |  |  |  |
| L24 |  | 2.60 | 1.60342 | 38.0 |
|  | R47 = −620.324 |  |  |  |
| L25 |  | 8.00 | 1.56907 | 71.3 |
|  | R48 = −22.042 |  |  |  |
|  |  | 0.20 |  |  |
|  | R49 = 268.749 |  |  |  |
| L26 |  | 8.00 | 1.69680 | 56.5 |
|  | R50 = −61.535 |  |  |  |
|  |  | Variable |  |  |
|  | R51 = −42.820 |  |  |  |
| L27 |  | 3.00 | 1.61340 | 43.8 |
|  | R52 = 36.328 |  |  |  |
|  |  | 9.78 |  |  |
|  | R53 = 450.496 |  |  |  |
| L28 |  | 2.29 | 1.61700 | 62.8 |
|  | R54 = −89.385 |  |  |  |
|  |  | 0.0 |  |  |
|  | R55 = 104.389 |  |  |  |
| L29 |  | 5.98 | 1.61700 | 62.8 |
|  | R56 = −40.049 |  |  |  |
|  |  | 11.42 |  |  |
|  | R57 = Infinity |  |  |  |
| G21 |  | 55.50 | 1.51633 | 64.1 |
|  | R58 = Infinity |  |  |  | where the lens elements L21 to L29 and the glass block G21 have surfaces R41 to R58, the index of refraction is given by $N_d$, and the dispersion is measured by the Abbe No. as given by $V_d$.

* * * * *